United States Patent
Yuda, Jr. et al.

[11] Patent Number: 5,918,708
[45] Date of Patent: Jul. 6, 1999

[54] LINEARLY DECELERATED POWERED SLIDES AND METHOD

[76] Inventors: Lawrence F. Yuda, Jr., Rte. 2, Box 266, West Union, S.C. 29696; Lawrence F. Yuda, 105 Meadowcrest Dr., Seneca, S.C. 29678; Prasad Balakrishnan, 4329-2 Avant Ferry Rd., Raleigh, N.C. 27606

[21] Appl. No.: 08/861,648

[22] Filed: May 22, 1997

[51] Int. Cl.[6] .................................................. B65H 59/10
[52] U.S. Cl. ........................... 188/67; 267/136; 267/161; 267/152; 267/140.4
[58] Field of Search ..................... 188/67, 378; 267/136, 267/161, 162, 30, 139, 140, 140.4, 116, 140.3, 152, 153, 158, 119, 130, 137; 92/85 R, 85 A, 85 B, 165 PR, 117 A, 165 R; 408/115 R; 384/7, 26; 248/562, 636, 638; 91/217

[56] References Cited

U.S. PATENT DOCUMENTS

| | | | |
|---|---|---|---|
| 3,107,905 | 10/1963 | Lucas | 267/140.4 |
| 3,371,899 | 3/1968 | Johnson | 267/140.4 |
| 3,375,000 | 3/1968 | Seamands et al. | 267/162 |
| 3,770,232 | 11/1973 | Blake | 267/140.4 |
| 5,113,746 | 5/1992 | Yuda | 92/165 PR |

*Primary Examiner*—Douglas C. Butler
*Attorney, Agent, or Firm*—Ralph Bailey, P.A.

[57] ABSTRACT

An end of stroke linear decelerator apparatus for powered slides and method include a disc spring member (A) retained upon a guide rod by a retainer disc member (B) which is itself positioned for retention upon a guide rod adjacent a tooling member. An elastomer retainer (C) positions the disc upon the guide rod and has an elastomer extension facing outwardly of the disc for dampening noises and forceful engagement with the frame which supports the guide rods.

11 Claims, 3 Drawing Sheets

LINEARLY DECELERATED POWERED SLIDES AND METHOD

BACKGROUND OF THE INVENTION

This invention relates to fluid powered slide units and more especially to an improved linear decelerator apparatus to facilitate bringing the slide to sudden and complete stops in a minimum of space while providing inexpensive and controllable dampening devices together with a method utilizing a metallic disc spring.

Fluid powered slide units are often subjected to heavy shock loads when brought to sudden complete stops. Conventionally, adverse results from damaging shock loads are avoided through the use of shock absorbers, including fluid filled and coil spring types or elastomeric bumpers. The invention contemplates providing controlled deceleration employing a disc spring.

By utilizing apparatus and method in accordance with the invention, the space and cost efficiency of an elastomeric bumper may be achieved while providing the superior controllability and deceleration of shock absorbers.

SUMMARY OF THE INVENTION

Accordingly, it is an important object of this invention to provide improved controllability for decelerating and bringing to sudden and complete stops a powered slide while avoiding damaging shock loads.

Another important object of the invention is the provision of a disc spring for utilization in providing a linear deceleration to fluid powered slides and the like wherein there is a linear relationship between the force produced and compression on the disc spring.

Another important object of the invention is the provision of an assembly for positioning a disc spring utilizing a metallic disc with an elastomer retaining ring, a small portion of which extends outwardly beyond the disc for engaging the opposed frame member providing a dampening effect reducing unwanted shock and noise as would result from initial metal to metal contact.

A conventional fluid powered slide unit is illustrated schematically in FIG. 1, by way of example. Other examples of powered slide units with which the invention may be advantageous employed are illustrated in U.S. Pat. Nos. 5,113,746 and 5,440,971 both of which are provided with double guide rods. Thus, the slide mechanism may consist of single or multiple guide rods attached to a tooling plate and constrained, and aligned within suitable bearings in the form of bores in a cylinder wall. A disc spring is mounted on the guide rods close to the tooling plate. The apparatus may further include a donut shaped metallic disc utilized with a disc spring. The metallic disc is preferably retained by compressing an elastomeric ring between it and the guide rod. About 20% of the elastomeric ring is preferably allowed to extend beyond the disc. The disc spring may thus be contained between a guide rod head member and the donut shaped disc spring.

When the slide retracts completely, the projecting or extending portion of the elastomeric ring contacts the frame, snubbing or dampening the noise produced by metal to metal contact. Further movement of the slide causes the disc spring to compress, producing forces in the opposite direction. These forces decelerate the slide, thereby preventing high speed impact and associated shock effects. The relationship between the force produced and the distance of compression of such a disc spring is linear. Moreover, compared to a standard helical spring, very little compression can produce large forces in a disc spring. These characteristics of the disc spring permits accurate design of apparatus providing a required deceleration within a limited range of axial movement. Further advantages result in that temperature and surrounding media have negligible effects on the system.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a linearly decelerated powered slide having a guide rod slidably carried in a frame member on one end and being connected on the other end through an abutment to a tooling member. A metallic disc spring A is positioned on the guide rod adjacent the abutment. The metallic disc spring has a central opening conforming to the cross-sectional shape of the guide rod. A metallic disc B is positioned on the guide rod adjacent the metallic disc spring. A restraining member C positions the annular metallic disc on the guide rod maintaining the metallic disc spring in a position adjacent the abutment. The metallic disc spring provides longitudinal deformation permitting limited longitudinal movement upon compression thereof due to the application of a decelerating force to said tooling member resulting in a substantially linear relationship between force and longitudinal deformation. The restraining member includes an elastomeric ring between the disc B and said guide rod projecting outwardly of said disc toward the frame member providing a snubbing action resulting in noise reduction.

Figure 1:
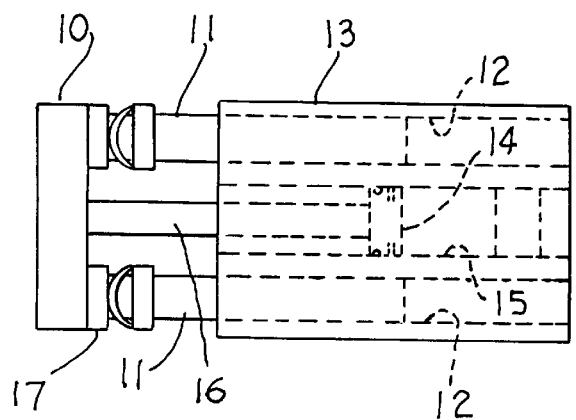
FIG. 1 is a schematic front elevation of a linearly decelerated powered slide, oriented substantially horizontally for illustration purposes, and method in accordance with the invention.

FIG. 1 is a schematic front elevation with the operating parts positioned horizontally illustrating a tooling member 10 in the form of a yoke. The yoke carries spaced guide rods 11 within bores 12 which contain suitable bearings. A cylinder or frame member is illustrated as at 13 for containing the bores 12 for accommodating the spaced guide rods 11. A piston 14 is carried within the cylinder 15 for operating a piston rod 16 for exerting a power stroke upon a tooling member or other element which is sought to be forcefully engaged or moved.

Figure 2:
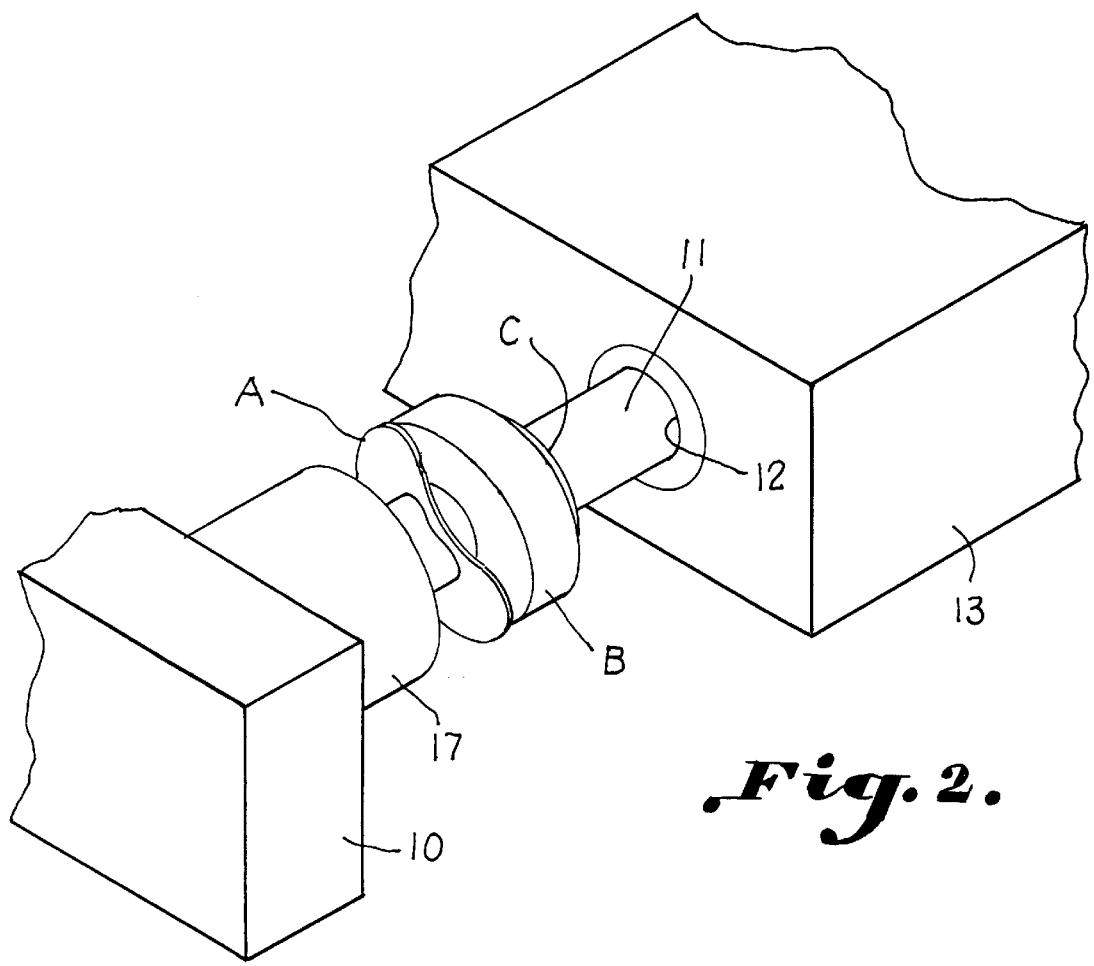
FIG. 2 is a perspective view illustrating a manor of mounting the metallic disc spring on a guide rod between a retaining disc and tooling member.
Figure 3:
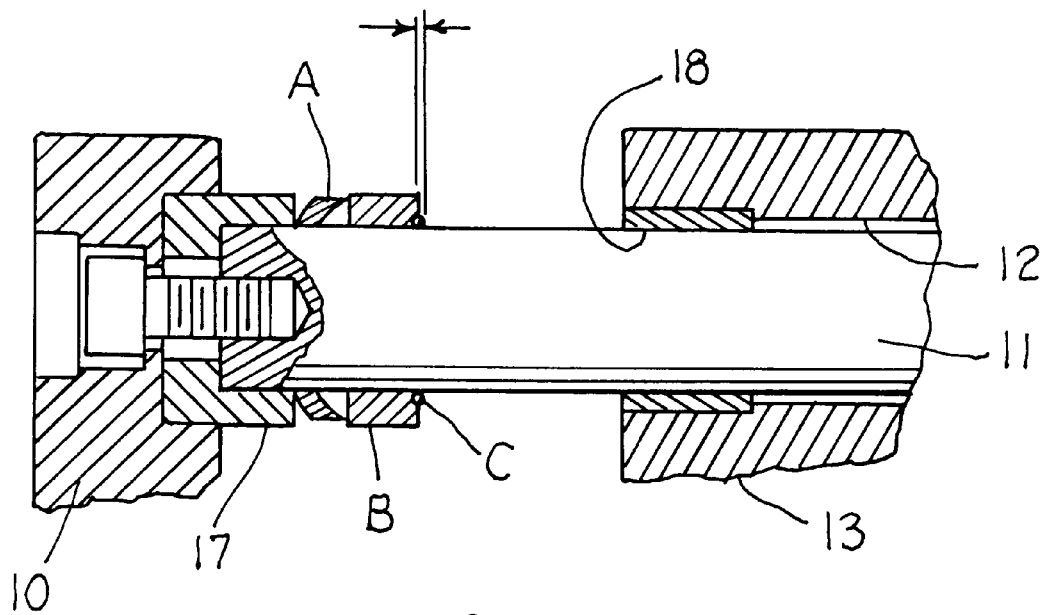
FIG. 3 is a longitudinal sectional elevation further illustrating the apparatus shown in FIG. 2.

FIG. 2 is an enlarged perspective view looking toward the lower left-hand end of FIG. 1 illustrating the positioning of an annular disc spring A carried between an annular metallic retaining disc B and a guide rod head member 17 which has connection with the tooling member 10. The metallic disc B is secured to the guide rod 11 as by an elastomer retaining ring C. As best shown in FIG. 3, the elastomer retaining ring has an elastomer extension preferably constituting about 20% of the ring diameter which projects outwardly toward the frame 13.

FIG. 3 illustrates the tooling plate member and the guide rod head in greater detail confining the disc spring A between it and the metallic disc member B for retaining the disc spring preferably in fixed longitudinal position upon the guide rod 11. The guide rod 11 is illustrated as being carried within a bearing member 18 within the bore 12.

The elastomer ring C is illustrated as having extended portions shown in FIG. 3 and captioned "elastomer extension" which projects beyond the metallic disc and acts to dampen shock and noise upon forceful deceleration near the end of a stroke of a powered slide for decelerating in a linear fashion.

Figure 4:
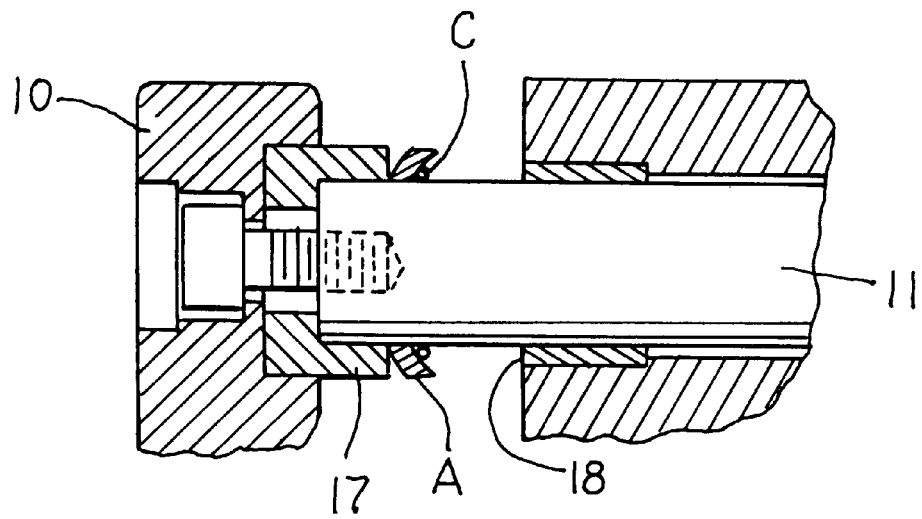
FIG. 4 is a longitudinal sectional elevation illustrating a modified form of the invention wherein the disc spring is illustrated as being concave and facing toward the frame member with an elastomer frame member positioning the spring upon a guide rod.
Figure 5:
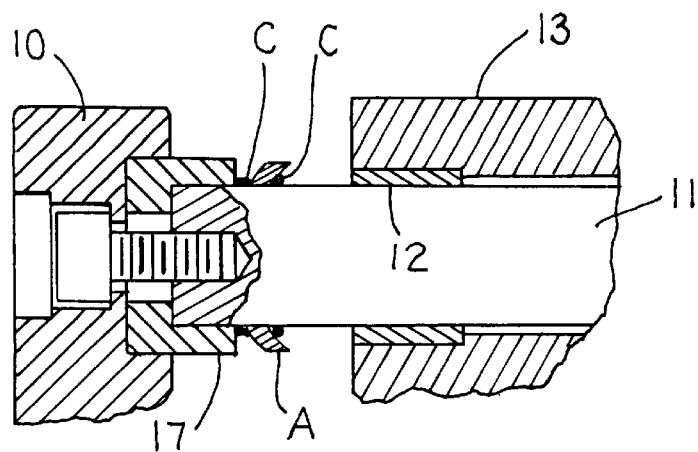
FIG. 5 is a longitudinal sectional elevation illustrating a further modification of the invention which includes an elastomer ring intermediate the concave spring and an abutment.
Figure 6:
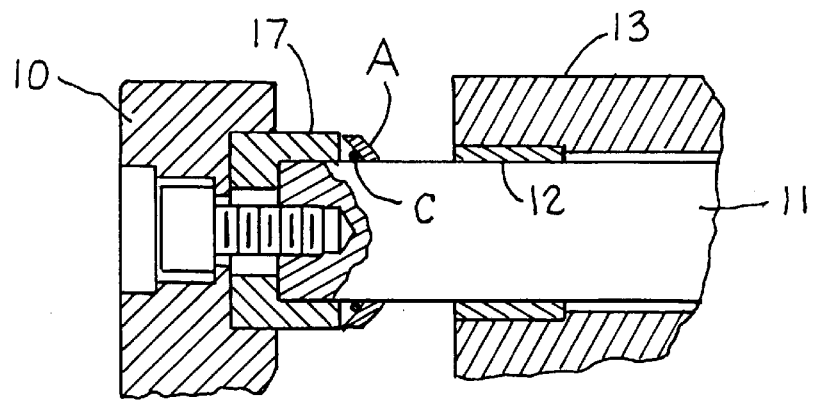
FIG. 6 is a longitudinal sectional elevation illustrating a further modified form of the invention wherein the disc spring is concave with an elastomer ring within the concave portion of the spring.
Figure 7:
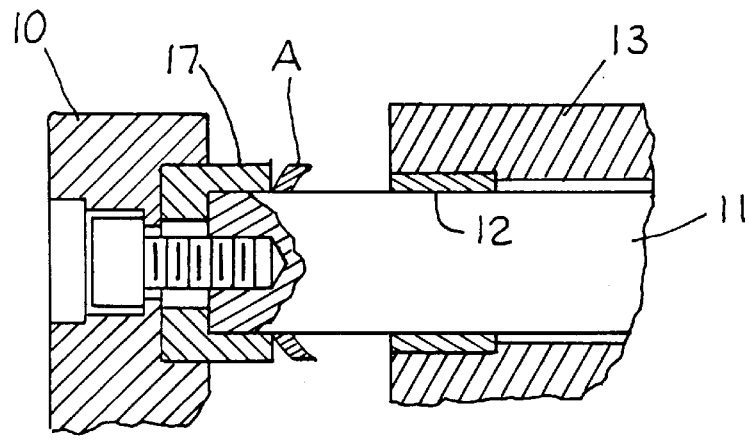
FIG. 7 is a schematic longitudinal sectional elevation illustrating a modified form of the invention wherein a member providing a pressed fit retains the disc spring upon the rod.

Suitable disc springs or washers may include stock curved spring washers such as Belleville spring washers, although any spring washers having desirable characteristics may be utilized. FIG. 4 illustrates a modified form of the invention wherein a disc spring concave toward a frame having an O-ring within the concavity. In FIG. 5 O-rings are provided on both sides of the disc spring. FIG. 6 illustrates utilization of an oppositely facing curved disc spring A with an O-ring therewithin. FIG. 7 illustrates the use of a disc spring having a pressed fit on the guide rod. Thus, a variety of constructions utilizing a disc spring to provide linear deceleration in a limited space have been provided.

While a preferred embodiment of the invention has been described using specific terms, such description is for illustrative purposes only, and it is to be understood that changes and variations may be made without departing from the spirit or scope of the following claims.

What is claimed is:

1. A linearly decelerated powered slide comprising:

a guide rod slidably carried in a frame member on one end a tooling member adjacent other end of the guide rod;

a power operated cylinder for forcefully moving the guide rod;

an annular metallic disc spring on said guide rod between said tooling member and said frame having a central opening conforming to the cross-sectional shape of said guide rod capable of longitudinal deformation permitting longitudinal movement upon compression thereof due to the application of a decelerating force to said tooling member resulting in a substantially linear relationship between force and longitudinal deformation; and a restraining member positioning said annular metallic disc spring on said guide rod maintaining said metallic disc spring adjacent said tooling member opposite said frame member.

2. The powered slide set forth in claim 1 wherein said means restraining said annular metallic disc spring on said guide rod includes an annular metallic disc on said guide rod adjacent said metallic disc spring, and an elastomeric ring between said disc and said guide rod projecting outwardly of said disc toward said frame member providing snubbing action resulting in noise reduction.

3. The powered slide set forth in claim 2 wherein a guide rod head is provided between the tooling member and the annular metallic disc spring.

4. The powered slide set forth in claim 1 wherein said annular metallic disc spring is concave and faces outwardly toward said frame member.

5. The powered slide set forth in claim 4 wherein an O-ring is utilized to maintain the spring in fixed longitudinal position on the rod.

6. The powered slide set forth in claim 4 wherein said annular metallic disc spring is press fit on said guide rod.

7. The powered slide set forth in claim 4 wherein an O-ring is utilized on both sides of said spring.

8. The powered slide set forth in claim 1 wherein said annular metallic disc spring is concave and faces inwardly toward said tooling member.

9. The method of linearly decelerating a powered slide having a guide rod slidably carried on a frame member on one end and being connected on the other end to a tooling member comprising the steps of:

forcefully moving the guide rod responsive to a power operated cylinder;

providing a metallic disc spring on said guide rod between said tooling member and said frame; and permitting continued longitudinal movement of the tooling member upon application of a decelerating force to said tooling member in substantially a linear relationship between force and longitudinal deformation of said metallic disc spring.

10. The method set forth in claim 9 including the step of restraining said metallic disc spring on said guide rod maintaining said metallic disc spring adjacent said tooling member.

11. The method set forth in claim 9 including the step of positioning an elastomeric ring between said metallic disc spring and said guide rod projecting outwardly of said disc toward said frame member providing snubbing action resulting in noise reduction.

* * * * *